United States Patent [19]

Bauer et al.

[11] Patent Number: 4,591,658
[45] Date of Patent: May 27, 1986

[54] CABLE CLAMP ATTACHMENT FOR ELECTRICAL OUTLET BOXES OR THE LIKE

[75] Inventors: Claude J. Bauer, Belpre, Ohio; Vernon D. Dellinger, Parkersburg; Oral F. Leep, Vienna, both of W. Va.

[73] Assignee: Challenger Electrical Marterials, Inc., Parkersburg, W. Va.

[21] Appl. No.: 661,749

[22] Filed: Oct. 17, 1984

[51] Int. Cl.⁴ .............................................. H02G 3/08
[52] U.S. Cl. .................................... 174/65 R; 220/3.2
[58] Field of Search ................ 174/65 R; 339/103 R, 339/103 B; 248/56; 220/3.2

[56] References Cited
FOREIGN PATENT DOCUMENTS
658727  3/1963  Canada ............................ 174/65 R

Primary Examiner—Arthur T. Grimley
Assistant Examiner—D. A. Tone
Attorney, Agent, or Firm—Sperry, Zoda & Kane

[57] ABSTRACT

An attachment for an electrical outlet box, junction box, or similar receptacle is swiftly, manually engageable in an opening of the outlet box. The attachment is inexpensively formed, preferably of a thermoplastic material, and is of a design lending itself to manufacture by the extrusion process to further reduce the cost of making it. The attachment may be of single or double form, and typically includes a resiliently flexible clamping leg one end of which is integrally formed with a mounting means readily engageable in the mounting opening of the outlet box. The other end is integral with a clamping head, that at least partially overlies a cable entrance, and is formed with serrations that bite into the surface of non-metallic, sheathed cable. When a cable is inserted it deflects the clamping head and leg against the spring tension of the leg. A force now exerted on the cable tending to pull it out of the outlet box causes the clamping head to grip the cable and at the same time, a force is transmitted through the leg tending to bind the mounting means against the adjacent wall of the outlet box. In this way the cable is securely locked in place. Intentional removal is readily permitted, through provision of means on the clamping head adapted to receive the bit of a screwdriver or the like, allowing force to be exerted against the head and leg tending to disengage the same from the cable.

7 Claims, 24 Drawing Figures

CABLE CLAMP ATTACHMENT FOR ELECTRICAL OUTLET BOXES OR THE LIKE

BACKGROUND OF THE INVENTION

1. Field of the Invention

The present invention relates generally to cable clamps for electrical outlet boxes or the like, and in a more particular sense, relates to clamps of this type limited to the engagement of cables having a non-metallic insulating sheathing. In yet a more particular sense, the invention has reference to cable clamps of the character described that are formed entirely of a plastic material, preferably by an extrusion process.

2. Description of the Prior Art

Outlet or junction boxes, whether plastic or metallic, are formed with knock-outs that are selectively removable to permit the insertion of one or more electrical cables into the box.

It is required that the inserted cables be clamped securely. To this end, many cable clamps have been designed, intended to efficiently discharge this function while yet meeting any one or more of various other desirable purposes, such as low manufacturing cost and ease of use.

Heretofore, however, in the highly competitive field of outlet box manufacture, desirably low manufacturing costs for the cable clamp means have not been fully achieved. In some instances, it has been proposed to mold cable clamps integrally with plastic outlet boxes, but this has proved unsatisfactory to some degree, by reason of the expense involved in constructing the molds, and the difficulty of achieving high volume, trouble-free production runs of the device.

In other instances, it has been proposed to provide cable clamp attachments that are manufactured separately from the outlet boxes, and are thereafter attached thereto. These, however, have in many instances consumed an excessive amount of time in the attachment step. This is highly undesirable, because it adds to the cost of the installing electrician's labor. This is a fact which must clearly be reckoned with, especially in the installation of outlet boxes through, for example, an entire residential project in which profitable installation of the electrical systems is possible only if every possible step is taken to reduce labor costs.

The present invention, accordingly, aims to achieve several desirable purposes, notably the swift and easy, manual attachment of the cable clamp constituting the present invention, to an outlet or junction box; the efficient gripping of an inserted cable, responsive merely to the exertion of a force tending to pull the cable out of the box; and, very importantly, the adaptability for manufacturing the device at a minimum manufacturing cost, utilizing not only relatively inexpensive, high production molds, but also, extrusion processes for at least some of the forms of the invention.

SUMMARY OF THE INVENTION

Summarized briefly, the invention is a cable clamp which is illustrated and described in a number of forms, all of which have, however, basic features in common.

Common to all the forms of the invention is a clamping leg, which in effect functions similarly to a flat leaf spring. The clamping leg is integral at one end with a mounting means, and at its other end with a clamping head. The mounting means, in all forms of the invention, includes an inner portion that engages against the inner surface of the wall of the outlet box, an outer portion that engages against the outer surface of the wall, and a connecting portion that extends through a mounting opening formed in the wall.

The clamping head is in the form of a generally semi-cylindrical element integral with the other end of the clamping leg. The head has a curved underside, formed with serrations that are adapted to bite into the surface of a non-metallic cable sheathing. Facing upwardly in the head is a means, such as a slot or recess, adapted to receive the bit of a screwdriver or the like, whenever the head is to be intentionally disengaged from the sheathing of the cable.

The device operates responsive to insertion of a cable through a cable entrance located below the mounting opening. Insertion of the cable deflects the head and leg against the inherent springiness of the leg. Thereafter, a relatively light pull-out force exerted on the cable causes the leg to be deflected inwardly toward the wall of the box, driving the head into the surface of the cable insulation. This force at the same time is transmitted through the length of the leg, to the mounting means thereof. Leverage is exerted on the mounting means, under these circumstances, tending to bind the inner portion, or the outer portion, or both of them, against the adjacent surfaces of the outlet box wall, thus causing the entire attachment to be tightly engaged with the outlet box and the cable. Intentional removal of the cable, however, is readily permitted by insertion of a bit of a screwdriver in the provided slot or recess, allowing the head and leg to be manually deflected out of the way so that the cable can be pulled completely out of the box.

The device is preferably molded entirely of a thermoplastic material, having suitable rigidity and springiness, and in many forms of the device can be manufactured by an extrusion process.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENTS

Referring to FIGS 1-4, in which a first form of the invention has been illustrated, the reference numeral 10 designates one form of outlet box, having a wall 12 which may be either the end or side wall of the box. The wall 12 is disposed wholly in one plane in the form illustrated in FIG. 1, and in spaced relation to the bottom wall 13 thereof, a mounting opening 14 is formed. Opening 14 (see FIG. 2) is rectangular, providing a straight upper edge 15 which, as will presently appear, is adapted to be engaged by the mounting means of the cable clamp attachment comprising the present invention.

Figure 1:
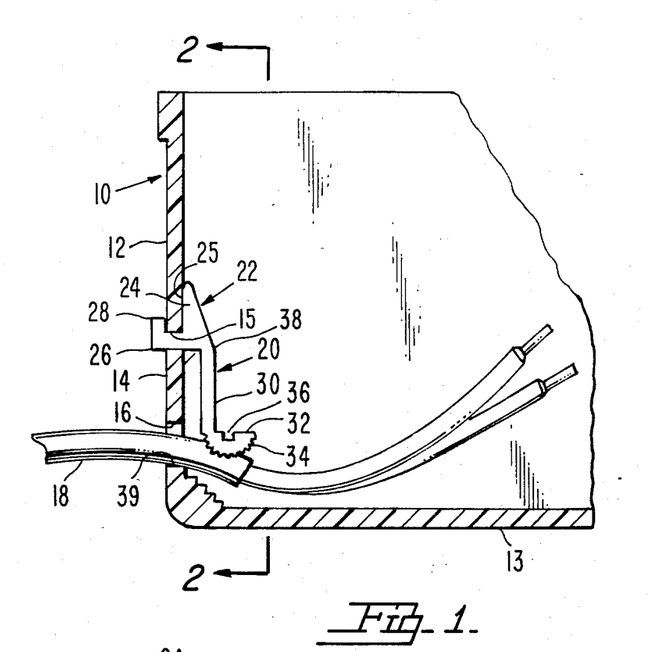
FIG. 1 is a fragmentary sectional view through a molded plastic outlet box, showing the cable clamp attachment in gripping engagement with an inserted cable.

Between bottom wall 13 and opening 14, there is provided a cable entrance 16 which initially, in accordance with conventional practice, would be covered by a knock-out (not shown). The knock-out is readily removable, to permit insertion of a conventional non-metallic, sheathed cable 18.

Cable 18, when inserted, is required by local and national electrical codes to be fixedly secured in place, once inserted. To this end, cable clamps are typically provided, often mounted directly within the cable entrance 16 or immediately adjacent thereto. The provision of a cable clamp of necessity adds considerable expense to the outlet or junction box, and this is particularly desirable in view of the highly competitive nature of the outlet box and wiring device industry. An important factor, too, is the high cost of labor involved in the wiring of a domestic or commercial electrical lighting, appliance, and/or equipment system.

It is, accordingly, important that the cable clamp be capable of manufacture at a low cost, and that additionally, it be capable of installation in the outlet box at a very low labor cost. It is also of considerable importance that the cable clamp be adapted to efficiently and securely grip the inverted cable, and that it do so with a minimum of effort and with minimum consumption of time, so far as the electrician is concerned.

Figure 2:
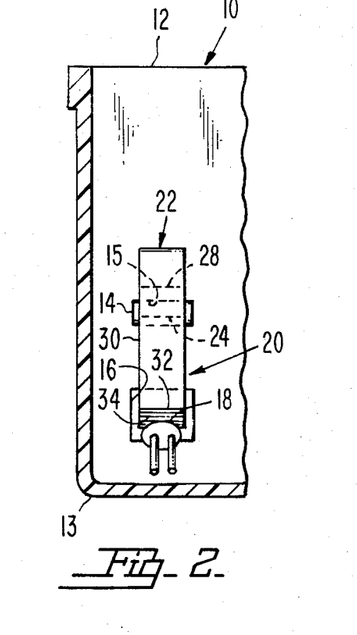
FIG. 2 is a sectional view substantially on line 2—2 of FIG. 1, illustrating the cable clamp attachment in front elevation.
Figures 3, 4, 5:
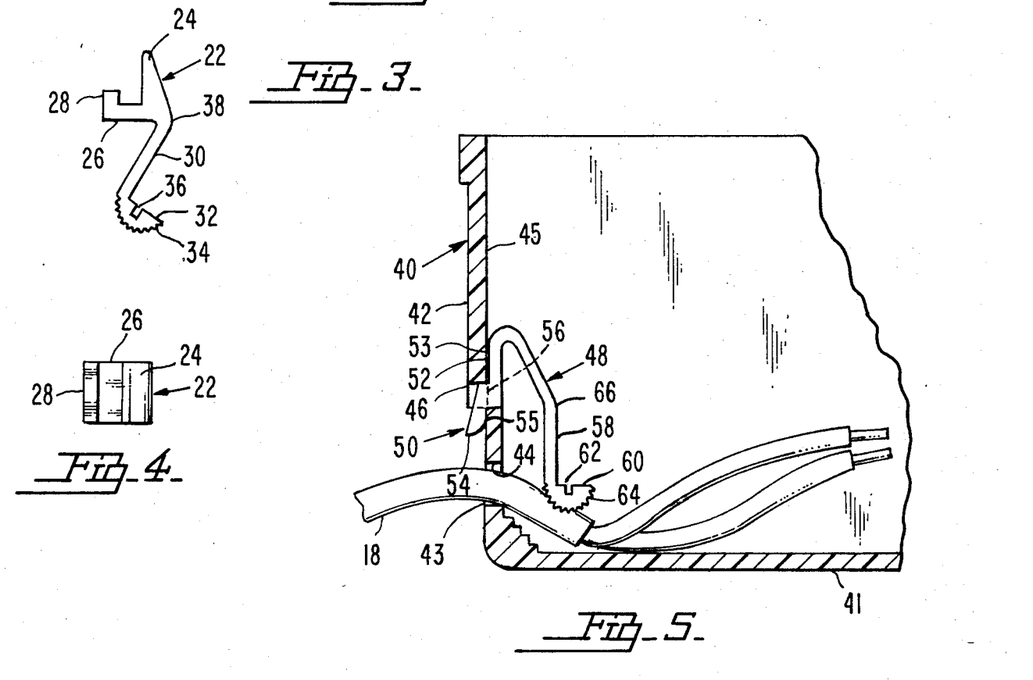
FIG. 3 is a side elevational view of the cable clamp per se, as it appears in its manufactured form prior to mounting in an outlet box.
FIG. 4 is a top plan view of the cable clamp attachment shown in FIG. 3.
FIG. 5 is a view similar to FIG. 1, illustrating a modified form of the cable clamp attachment in cable-engaging position.

Accordingly, there is provided, for the purpose of meeting these desirable ends, a cable clamp attachment generally designated 20, which in the form shown in FIG. 1-3, is not only manufactured entirely from a relatively inexpensive thermoplastic material having the requisite resiliency, strength, and flexibility, but in addition, is capable of manufacture by an extrusion process. In other words, a cable clamp such as illustrated in FIG. 1 can be extruded in the form of an elongated strip, having the shape shown in FIG. 3, after which the strip can be cut at predetermined intervals, to form a large quantity of individual cable clamps having the initial shape shown in FIG. 3.

A cable clamp attachment such as shown at 20 includes, at one end, a mounting means generally designated 22, whereby the cable clamp attachment is connectable to the outlet box 10. Mounting means 22, in the illustrated example shown in FIGS. 1-3, may be appropriately considered as comprising three portions integrally joined in side-by-side relation.

The three portions constituting the mounting means 22 comprises, in the illustrated example, an inner mounting lug or end portion 24 which in the illustrated example is of triangular configuration, having a flat inner surface 25 adapted to extend along the inner surface of the wall 12. Portion 24 is integral with a connecting portion 26, which extends through the opening 14, and which has a flat surface engageable against edge 15 of the opening.

Connecting portion 26 in turn merges into an outer end portion 28 of the mounting means.

In the construction illustrated in FIGS. 1-3, the mounting means thus has the configuration, generally speaking, of a U, wherein the connecting portion 26 constitutes the bight of the U-shaped mounting means, and the inner and outer end portions 24, 28 thereof constitute the arms of the U, said arms being disposed in embracing relation to the portion of the wall 12 disposed immediately adjacent opening 14 and more specifically, the edge 15 of said opening.

With further regard to the form of the invention shown in FIGS. 1-3, the cable clamp attachment adjacent the mounting means 22, is integrally formed with an elongated, relatively flat, wide, spring leg 30. Leg 30 constitutes a clamping leg, and is extended between the openings 14, 16, in close proximity to but in spaced relation to the wall 12. Leg 30 is integral, at the end thereof remote from the mounting means 22, with a clamping head 32.

Clamping head 32, in the form of the invention shown in FIGS. 1-3, is of semi-cylindrical form, when viewed in side elevation as in FIGS. 1 and 3. The clamping head, thus, has a curvilinear underside 34, extending through substantially 180°, and formed over its entire length with transversely extending, relatively sharp serrations or teeth 34.

The other surface of the head 32 is flat, and is formed with a transversely extending kerf or screwdriver slot 36, extending through the full width of the head and opening at both sides thereof.

Figures 19, 21, 22, 24:
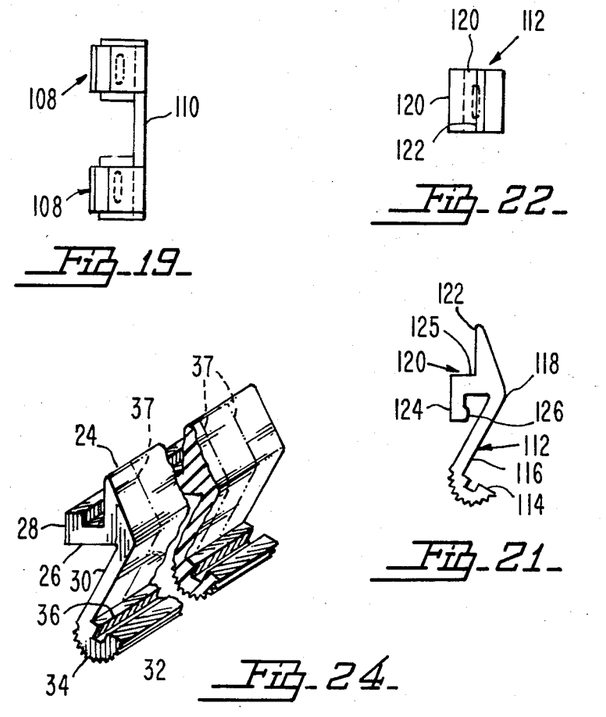
FIG. 19 is a top plan view of the double cable clamp shown in FIG. 18.
FIG. 21 is a side elevational view of yet another modification, showing the cable clamp per se, as it appears in its manufactured condition prior to installation in an outlet box.
FIG. 22 is a top plan view of the cable clamp shown in FIG. 21.
FIG. 24 is a perspective view, portions being broken away, of an extrusion used in manufacture of the form of the device shown in FIGS. 1-3.

By reason of this arrangement, the cable clamp attachment shown in FIGS. 1-3 can be initially extruded in the form of an elongated strip of thermoplastic material, which in cross section would initially have the shape shown in FIG. 3. This strip, thus, would initially appear as shown in FIG. 24, and would be extrudable to any desired length. After extrusion, it would be cut along the dotted lines shown in FIG. 24 at 37, to form the individual cable clamp attachments at a very low overall manufacturing cost.

As will be noted, in the form shown in FIGS. 1-3, leg 30 is initially extended angularly inwardly in respect to the mounting means 22, so as to initially dispose the clamping head 32 almost directly below the mounting means. This disposition of leg 30 at an angle of inclination in respect to the mounting means 22, and in particular in respect to the connecting portion 26 and the arms 24, 28 thereof, causes the leg 32 to be disposed in close proximity to the cable entrance 16 when the device is mounted in the opening 14 of the outlet or junction box 10. Leg 30, as previously noted, is resiliently flexible, and accordingly, when the device is mounted in position, and a cable 18 is inserted, the cable initially engages the head 32, and forces the same away from the cable entrance 16 to the FIG. 1 position, to permit passage of the cable. The cable can be pushed into the outlet box to whatever extent is desired or necessary by the installer.

At this point, an important characteristic of the invention should be noted. Before cable 18 is inserted, and when the cable clamp attachment is to be mounted in the outlet box, all that is necessary is that one manually grasp the cable clamp attachment, and with the cable clamp attachment disposed inside the box, one thereafter extends the outer end portion 28 of the mounting means 22 through the opening 14.

At this time, the cable clamp attachment is relatively loosely mounted in the opening 14, since the opening 14 must be of a size sufficient to permit passage of the arm 28 and the connecting portion 26.

When, however, cable 18 is inserted through the cable entrance 16, the deflection of the head 32 and hence of the leg 30, causes the leg to flex about the bending area 38 provided at the location of the integral connection of the leg 30 to the mounting means 22.

This is in turn translated into a force tending to rock the U-shaped mounting means in a counterclockwise direction as viewed in FIG. 1, causing the arm 28 and the arm 25 to bind against the outer and inner surfaces, respectively, of the wall 12, with the surface of the connecting portion 26 at the same time binding against the edge 15. As a result, when the leg 30 has been deflected fully from the FIG. 3 to the FIG. 1 position thereof, leg 30 is under strong tension, and this tension is translated into a tight binding of the mounting means against the edge 15 and the inner and outer surfaces of the outlet or junction box.

When the cable has been inserted to the desired extent, a relatively light force exerted on the cable tending to pull it out of the box is applied by the installer. This causes the serrations 34 to bite into the softer material of which the sheathing of the cable 18 is formed. The result is that the serrations or teeth 34 grip the cable securely, forcing the cable against the bottom edge 39 of opening 16.

At this point, it will be understood that use of the terms "bottom", "side", and "upper" apply only to the positions of the various components as illustrated in the drawings comprising a part of this application. In actual practice, of course, the outlet box might be inverted from the position shown in FIG. 1, or turned 90° from the position shown in that Figure of the drawing.

In any event, when the relatively light pulling force is exerted on the cable, that is, when a force is exerted on the cable tending to pull it to the left as viewed in FIG. 1, the head 32 tends to travel therewith by reason of the fact that the teeth 34 are engaged in the sheathing of the cable. The result is that this is in turn translated into a force tending to compress the leg 30 in the longitudinal direction, binding the mounting means 22 even more tightly within the opening 14, and forcing the head 32 into even a tighter gripping engagement with the cable. In other words, the more force that is applied tending to pull the cable out, the tighter will be the grip of the cable clamp attachment thereon.

In the form of the invention shown in FIGS. 5-8, the outlet box 40 is of a slightly different type, having a shape that is somewhat different from that shown in FIG. 1, the shape of the outlet box in FIG. 5 being dictated by molding considerations.

In this form, the outlet box has a bottom wall 41, integral with a side or end wall 42. Wall 42 has an inwardly offset lower portion 43, in which there is formed a cable entrance 44.

Inwardly offsetting wall 43 into a plane parallel to the plane of the upper portion 45 of wall 42, permits automatic definition of a mounting opening 46 for the mounting means of the cable clamp attachment 48.

Since the upper and lower edges of the opening 46 are relatively offset, the mounting means 50 of the cable clamp attachment 48 is formed differently from the mounting means 22 shown in FIGS. 1-4.

In this form of the invention, means 50 again has an inner end portion 52, having a flat surface 53 that extends along and is adapted to engage the inner surface of the upper wall portion 45 of outlet box wall 42. Inner end portion 53 is connected to an outer end portion 54 by means of a connecting portion 56.

Thus, in this form of the invention there is again provided inner and outer end portions joined by a connecting portion, except that in FIGS. 5-8, the mounting means does not have the shape of a U, but rather, might be considered as being of zig-zag or Z shape.

In any event, as in the first form of the invention, the mounting means has inner and outer end portions, with the inner end portion having a surface 53 bearing against the inner surface of wall 42, while the outer end portion 54 has an inner surface 55 bearing against the outer surface of the wall 42. In this respect, accordingly, the mounting means 22 and the mounting means 50 have basically the same characteristics as regards their capability for engaging in a rectangular mounting opening of the outlet box wall.

Figures 6, 8:
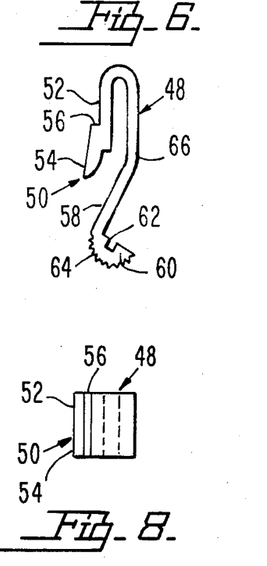
FIG. 6 is a side elevational view of the cable clamp attachment of FIG. 5, per se, as it appears in its manufactured form prior to mounting in an outlet box.
FIG. 8 is a top plan view of the cable clamp attachment of FIG. 5.
Figure 7:
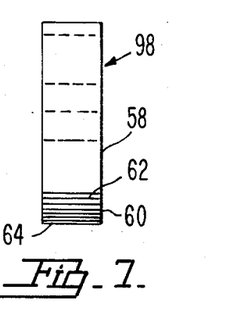
FIG. 7 is a front elevational view of the cable clamp attachment of FIG. 5.

As in the first form of the invention, integral with the mounting means is an elongated, relatively wide, resiliently flexible clamping leg 58, merging into a semicylindrical clamping head 60 having a curvilinear underside and a flat upper surface. The upper surface is formed with a screwdriver slot or kerf 62, while the curved underside of head 60 is formed with serrations or teeth 64.

The bending point of the arm 58 is designated at 66 in FIGS. 5 and 6, and initially, the cable clamp attachment 48 would be manufactured in the form shown in FIG. 6.

As in the first form, this particular design lends itself to manufacture by an extrusion process, so that a strip can be made in the same manner as shown in FIG. 24 for the first form of the invention.

The completed cable clamp attachment shown in FIGS. 5-8, is mountable in the opening 46 merely by extension of the outer portion 54 and connecting portion 56 through opening 46. This loosely engages the cable clamp attachment with the wall 42 of the outlet box.

Thereafter, cable 18 is inserted through cable entrance 44, and will deflect leg 58, and head 60, from the initial cocked or inclined position shown in FIG. 6, to the position shown in FIG. 5.

In the FIG. 5 position, leg 58 is placed under tension, and this tension is transmitted to the mounting means, causing surfaces 53, 55 of the inner and outer end portions 52, 54 of the mounting means, to bind tightly against the inner and outer surfaces, respectively, of the outlet box wall 45.

In this way, accordingly, one sees that the mounting means of the second form of the invention, though physically different from the mounting means of the first form, operates in substantially the same way, that is, it is forced into binding engagement with the outer and inner surfaces of the outlet box wall, adjacent the mounting opening 14.

Again, a slight force tending to pull the cable 18 out of the outlet box, sets the head 60 tightly into the surface of the sheathing, and engages the mounting means even more tightly against the outlet box, by reason of the fact that the pullout force tends to flex leg 58 in such a way as to cause the force exerted on the leg to be translated both into a tighter engagement of the mounting means in the opening of the outlet box wall, and a correspondingly tighter gripping engagement of the head 60 with the surface of the sheathing of the cable.

Figures 9, 10, 11:
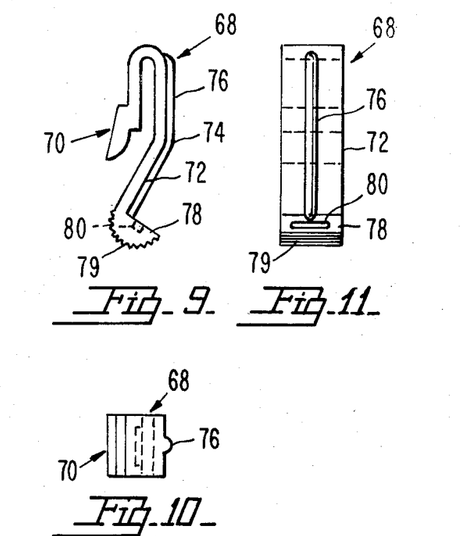
FIG. 9 is a side elevational view of another modified form of cable clamp attachment, as it appears in its manufactured form prior to installation in an outlet box.
FIG. 10 is a top plan view of the modified device shown in FIG. 9.
FIG. 11 is a front elevational view of the device shown in FIG. 9.

In FIGS. 9-11, another form of the invention is shown, which is basically similar in operating characteristics and form to the modifications shown in FIGS. 5-8. The device shown in FIGS. 9-11, however, does not lend itself to manufacture by the extrusion process, and each cable clamp attachment would be molded individually, from suitable thermoplastic material having the requisite characteristics of strength, resiliency, and flexibility.

In this form of the invention, the cable clamp attachment has been generally designated 68, and includes a mounting means 70 identical to mounting means 50.

Thus, in this form of the invention, there is an inclined leg 72 which initially appears as shown in FIG. 9, inclined at the same angle as the legs 30 or 58. Leg 72 has a bend area 74 corresponding in location to the bend area 66, but in this form of the invention, the leg is rigidified to some degree by a longitudinally and centrally extending, molded reinforcing rib 76.

Leg 72 merges, as in the other forms of the invention, into a clamping head 78 of semi-cylindrical shape, having a curved underside formed with serrations 79, and a flat upper surface formed with a screwdriver bit or kerf 80. Kerf 80, since the device is not made by the extrusion process in FIGS. 9-11, does not have to extend fully from side-to-side of the head 78.

The installation procedure, and the procedure of inserting and clamping the cable, is the same as in FIGS. 1 and 5 for the form of the invention shown in FIGS. 9-11.

Figure 12:
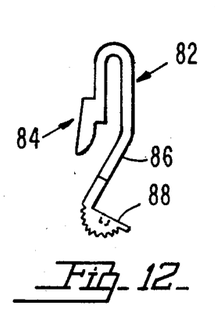
FIG. 12 is a side elevational view of yet another modified cable clamp attachment, as it appears in its manufactured form prior to installation in an outlet box.
Figure 13:
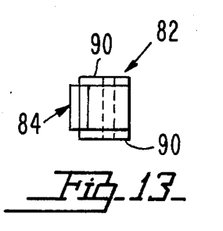
FIG. 13 is a top plan view of the modification shown in FIG. 12.
Figure 14:
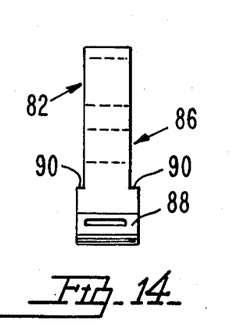
FIG. 14 is a front elevational view of the modified device shown in FIG. 12.

In FIGS. 12-14, there is shown yet another form of the invention, which is basically similar in general shape and mode of use, to the devices already illustrated and described, and especially to those illustrated in FIGS. 5-11.

Thus, in this form of the invention the cable clamp attachment 82 is again of molded thermoplastic material, but as is true in the form of FIGS. 9-11, is not manufactured by the extrusion process. Rather, each piece is molded separately.

In this form of the invention, the mounting means 84 is similar to the mounting means 50 or 70, and hence needs no further description. Clamping leg 86 is similar to leg 58, and also needs no further description, being integral with a clamping head 88 similar to that shown in FIG. 9.

In this form of the invention, the main difference is that the clamping head is widened, so as to grip a cable of greater width, while the mounting means 84 and the clamping leg 86 are slightly narrower, thus defining shoulders 90 a short distance from the merger of the clamping leg into the head 88.

In FIGS. 15-17, once again the device is illustrated in a form that permits it to be manufactured from a suitable thermoplastic material having the requisite characteristics of resiliency, strength, and flexibility while still being adapted to be manufactured as an extruded, elongated strip capable of being cut into pieces to form the individual clamping attachments.

In this form of the invention, the cable clamp attachment 92 has a mounting means 94 similar to that shown in the devices of FIGS. 5-14, hence requiring no further description or discussion of the installation and functional characteristics thereof.

Figure 15:
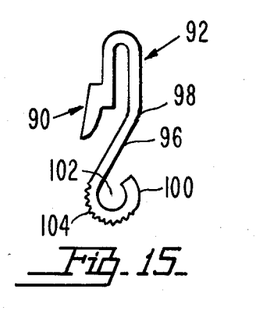
FIG. 15 is a side elevational view of still another modified form, as it appears in its manufactured condition, prior to installation in an outlet box.
Figure 16:
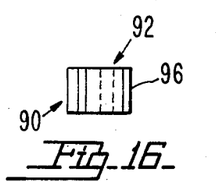
FIG. 16 is a top plan view of the device shown in FIG. 15.
Figure 17:
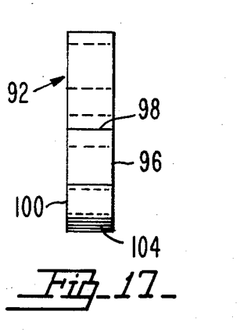
FIG. 17 is a front elevational view of the device shown in FIG. 15.

Integral with the mounting means 92 is a clamping leg 96 having a bend area 98, merging into a clamping head 100.

The clamping head 100 is formed, in this modification, as a curved extension of the leg 96, that is, the leg 96 assumes a J-shape in cooperation with the head 100, and cooperates with the reversely curved head 100 to define a recess 102 that defines a slot for receiving the bit of a screwdriver or similar tool. The head again is approximately semi-cylindrically curved, with a curved underside formed with serrations 104.

This device operates in the same manner as those previously described herein, that is, the cable is inserted, deflecting leg 96 outwardly from the adjacent wall of the outlet box. Then, a slight pullout force on the cable causes the head to bind tightly against the cable sheathing, while the mounting means 94 is similarly tightly engaged with the wall of the outlet box adjacent the clamp-receiving opening of that wall.

Figure 18:
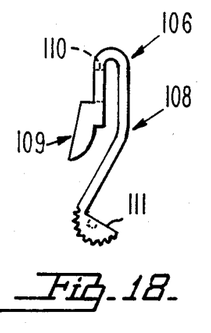
FIG. 18 is a side elevational view of still another modified form, in which the device is manufactured as a double cable clamp attachment, adapted to engage side-by-side, inserted cables.
Figure 20:
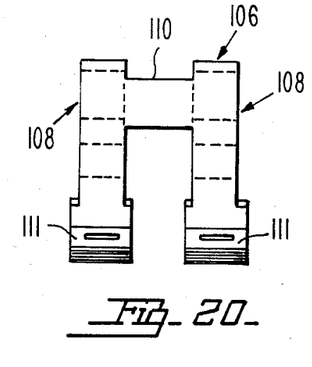
FIG. 20 is a front elevational view thereof.

In the form of the invention shown in FIGS. 18-20, the cable clamp attachment is illustrated in a double configuration, that is, in this form the clamp attachment 106 comprises transversely spaced, individually functioning cable clamps 108, 108. These are integrally joined by a connecting portion 110. As in the first form of the invention, each of the cable clamps 108 has its own mounting means 109 and its own clamping head 111 having serrations on its underside and a screwdriver slot on its upper surface.

A device such as shown in FIGS. 18-20 would be mountable in position to function with respect to transversely spaced cable entrances, each of which entrances would receive a separate cable. Further, above each cable entrance there would be provided a mounting opening for the means 109 of each clamping device 108. The entire device is readily installed by inserting the mounting means 109 through their associated, transversely spaced mounting openings, so that this will dispose the heads 111 over the correspondingly transversely spaced cable entrances.

This device, of course, again would be manufactured by a molding procedure wherein each device is separately molded, as compared to a procedure in which an elongated strip is extruded and thereafter cut into pieces to form the finished cable clamps.

In this form of the invention, each clamping device 108 of course functions separately from the other, that is, both clamps 108, though integrally joined, act upon cables separately inserted through the side-by-side cable entrances, with each cable clamp being thus adapted to engage its own, integrally joined mounting means 109 against the wall of the outlet box.

Figure 23:
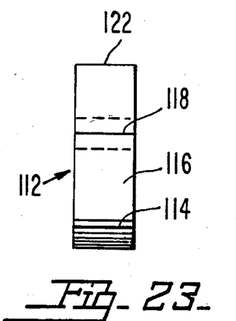
FIG. 23 is a front elevational view of the modified form shown in FIG. 21.

In FIGS. 21-23, yet another form of the invention is shown. This form of the invention again comprises a single type of cable clamp attachment, as compared to the double type shown in FIGS. 18-20. In this form of the invention, the cable clamp attachment has been generally designated 112, and includes a clamping head 114 similar to that shown in FIGS. 1-4, integral with a clamping leg 116 which is also similar to that shown in FIGS. 1-4. Clamping leg 116 has a bend area 118 where it is integrally joined with a mounting means generally designated 120.

Mounting means 120 is generally similar to the mounting means shown in, for example, the form of the invention illustrated in FIGS. 5-8. Thus, it includes a generally triangular, upwardly projecting inner end portion 122 of the mounting means, connected to an oppositely extended outer end portion 124 through the provision of a connecting portion 125.

The main difference between the mounting means shown in FIGS. 21-23, and that shown in, for example, FIGS. 5-8, resides in the provision of a bead 126 formed upon the inner surface of the outer portion 124 of the mounting means, at the distal end thereof.

The device shown in FIGS. 21-23, whether or not made by the extrusion process, is installable in the outlet box in generally the same manner as the devices previously illustrated and described herein. When, however, the outer portion 124 is extended through the opening of the outlet box, the bead 126 will cooperate with the leg 116 in binding the device more tightly against the outlet box, even prior to insertion of the cable, since the wall of the outlet box, immediately below the mounting opening 14, will be gripped between the leg 116 and the bead 126.

Thereafter, when the cable is inserted, once again it deflects the leg 116 away from the wall of the outlet box. Thereafter, when the pullout force is exerted upon the cable, the mounting means will bind against the inner and outer surfaces of the outlet box wall in the same manner as is true of all the other forms of the invention previously described herein. The bead 126 firmly engages against the outer surface of the outlet box wall, under these circumstances. The entire device is thus tightly engaged with the wall of the outlet box, and at the same time, there is of course a corresponding tight, gripping engagement of the serrated head 114 with the sheathing of the inserted cable.

In all forms of the invention, the device can be manufactured at very low cost, and does not have to be molded integrally with the outlet box. This permits the outlet box to be made at relatively low cost, with substantially trouble-free production runs due to the fact that the outlet box itself does not need to have integral cable clamp attachments that complicate the tools and that render malfunction of the molds more frequent. Instead, the outlet boxes can be manufactured cheaply and in large quantities, at relatively low cost, and the cable clamps can be separately manufactured, at a cost which is far below that true of cable clamp attachments heretofore devised.

At the same time, labor costs are reduced, with respect to the installation of the cable clamp in the outlet box, and the manner in which the cable clamp is used when the cable is inserted during the actual wiring of the residence or business establishment. All that is necessary is that the cable clamp be manually engaged in the mounting opening 14 or 46, as the case may be, after which the mere insertion of the cable, and the subsequent pullout force on the cable, causes the cable to be tightly clamped or gripped, and retained in the clamped position without danger of its working loose. The pullout force, of course, is exerted to whatever extent is necessary to produce a strong grip of the serrated head upon the inserted cable, with the cable being effectively clamped between the edge of the cable entrance, and the serrated head of the device. At the same time, the mounting means of the device is equally tightly engaged against the inner and outer surfaces of the outlet box wall.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. A cable clamp attachment for an electrical outlet box of the type having a first wall serving as a bottom wall and a second wall that extends from the first wall, said second wall having inner and outer surfaces and being formed with a mounting opening and a cable entrance both of which open upon said surfaces, said attachment being in the form of a single molded plastic piece comprising:
   (a) a mounting means adapted to constitute the sole point of connection of the clamp attachment to an outlet box of the type described, said means being formed at one end of said attachment and being adapted to extend through said mounting opening in engagement with the outer and inner surfaces of the box, in position to dispose the other end of the attachment in spaced relation to said bottom wall of the outlet box adjacent the cable entrance and free of any connection to the box, whereby a cable inserted through said entrance may be extended between and engaged directly by the bottom wall and said other end of the attachment; and
   (b) an elongated, resiliently yieldable clamping leg having a proximal end integrally joined with the mounting means and a distal end formed with a clamping head for engaging the inserted cable, the clamping leg being initially inclined angularly inwardly in respect to the mounting means to dispose the clamping head initially approximately directly below the mounting means with the leg in close proximity to the cable entrance of the associated outlet box, said head being adapted for engagement with an inserted cable for resilient flexure of the leg, responsive to insertion of the cable, away from the cable entrance and said second wall of the associated box, the mounting means including inner and outer end portions engageable against said inner and outer surfaces, respectively, of said second outlet box wall, at least the inner end portion having a flat face extendable along its associated surface of the second wall of the outlet box when the mounting means is extended through the mounting opening, said distal end of the clamping leg, in the initial angular inclination of the clamping leg, extending through the plane of said face, the mounting means further including a connecting portion joining the respective end portions thereof and extending through said mounting opening, the inner and outer portions of the mounting means extending in the same direction from the connecting portion.

2. A cable clamp attachment for an electrical outlet box of the type having a first wall serving as a bottom wall and a second wall that extends from the first wall, said second wall having inner and outer surfaces and being formed with a mounting opening and a cable entrance both of which open upon said surfaces, said attachment being in the form of a single molded plastic piece comprising:

(a) a mounting means adapted to constitute the sole point of connection of the clamp attachment to an outlet box of the type described, said means being formed at one end of said attachment and being adapted to extend through said mounting opening in engagement with the outer and inner surfaces of to box, in position to dispose the other end of the attachment in spaced relation to said bottom wall of the outlet box adjacent the cable entrance and free of any connection to the box, whereby a cable inserted through said entrance may be extended between and engaged directly by the bottom wall and said other end of the attachment; and (b) an elongated, resiliently yieldable clamping leg having a proximal end integrally joined with the mounting means and a distal end formed with a clamping head for engaging the inserted cable, the clamping leg being initially inclined angularly inwardly in respect to the mounting means to dispose the clamping head initially approximately directly below the mounting means with the leg in close proximity to the cable entrance of the associated outlet box, said head being adapted for engagement with an inserted cable for resilient flexure of the leg, responsive to insertion of the cable, away from the cable entrance and said second wall of the associated box, the mounting means including inner and outer end portions engageable against said inner and outer surfaces, respectively, of said second outlet box wall, at least the inner end portion having a flat face extendable along its associated surface of the second wall of the outlet box when the mounting means is extended through the mounting opening, said distal end of the clamping leg, in the initial angular inclination of the clamping leg, extending through the plane of said face, the mounting means further including a connecting portion joining the respective end portions thereof and extending through said mounting opening, the end portions of the mounting means extending perpendicularly to the connecting portion.

3. A cable clamp attachment as in claim 2 wherein the clamping leg is initially formed with a single bend point where it is integrally joined to the mounting means and is tensioned to resiliently, yieldably flex about said point in a direction away from said second wall of the outlet box responsive to insertion of the cable and thereby force at least one of said surfaces of the end portions of the mounting means into binding engagement with the outlet box wall surface adjacent thereto.

4. A cable clamp attachment for an electrical outlet box of the type having a first wall serving as a bottom wall and a second wall that extends from the first wall, said second wall having inner and outer surfaces and being formed with a mounting opening and a cable entrance both of which open upon said surfaces, said attachment being in the form of a single molded plastic piece comprising:

(a) a mounting means adapted to constitute the sole point of connection of the clamp attachment to an outlet box of the type described, said means being formed at one end of said attachment and being adapted to extend through said mounting opening in engagement with the outer and inner surfaces of the box, in position to dispose the other end of the attachment in spaced relation to said bottom wall of the outlet box adjacent the cable entrance and free of any connection to the box, whereby a cable inserted through said entrance may be extended between and engaged directly by the bottom wall and said other end of the attachment; and (b) an elongated, resiliently yieldable clamping leg having a proximal end integrally joined with the mounting means and a distal end formed with a clamping head for engaging the inserted cable, the clamping leg being initially inclined angularly inwardly in respect to the mounting means to dispose the clamping head initially approximately directly below the mounting means with the leg in close proximity to the cable entrance of the associated outlet box, said head being adapted for engagement with an inserted cable for resilient flexure of the leg, responsive to insertion of the cable, away from the cable entrance and said second wall of the associated box, the clamping head extending laterally from said clamping leg, the clamping head being formed with a curvilinear surface adapted for engaging and gripping the inserted cable.

5. A cable clamp as in claim 4 wherein said cable-engaging surface of the head is formed with a series of serrations adapted to be forced into the surface of the cable responsive to the exertion of a force upon the inserted cable in a direction to pull the same out of the outlet box.

6. A cable clamp attachment as in claim 5 wherein, responsive to the exertion of said force, the clamping leg is flexible in a direction to drive the serrations into the surface of the inserted cable.

7. A cable clamp attachment for an electrical outlet box of the type having a first wall serving as a bottom wall and a second wall that extends from the first wall, said second wall having inner and outer surfaces and being formed with a mounting opening and a cable entrance both of which open upon said surfaces, said attachment being in the form of a single molded plastic piece comprising:

(a) a mounting means adapted to constitute the sole point of connection of the clamp attachment to an outlet box of the type described, said means being formed at one end of said attachment and being adapted to extend through said mounting opening in engagement with the outer and inner surfaces of the box, in position to dispose the other end of the attachment in spaced relation to said bottom wall of the outlet box adjacent the cable entrance and free of any connection to the box, whereby a cable inserted through said entrance may be extended between and engaged directly by the bottom wall and said other end of the attachment; and (b) an elongated, resiliently yieldable clamping leg having a proximal end integrally joined with the mounting means and a distal end formed with a clamping head for engaging the inserted cable, the clamping leg being initially inclined angularly inwardly in respect to the mounting means to dispose the clamping head initially approximately directly below the mounting means with the leg in close proximity to the cable entrance of the associated outlet box, said head being adapted for engagement with an inserted cable for resilient flexure of the leg, responsive to insertion of the cable, away from the cable entrance and said second wall of the associated box, said clamping head being extended laterally from the leg and being formed approximately semi-cylindrically with a curvilinear underside having a series of cable-gripping serrations, the head having an upper surface formed with means adapted to receive the bit of a screwdriver or the like, for flexing the leg away from the cable when the cable is to be intentionally removed from the outlet box.

* * * * *